(12) United States Patent
Kikuchi et al.

(10) Patent No.: US 8,275,000 B2
(45) Date of Patent: Sep. 25, 2012

(54) WIRELESS COMMUNICATION SYSTEM, BASE STATION, AND WIRELESS COMMUNICATION METHOD

(75) Inventors: Shingo Kikuchi, Tokyo (JP); Motoya Iwasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 843 days.

(21) Appl. No.: 12/155,711

(22) Filed: Jun. 9, 2008

(65) Prior Publication Data

US 2009/0003304 A1    Jan. 1, 2009

(30) Foreign Application Priority Data

Jun. 29, 2007    (JP) .................. 2007-172463

(51) Int. Cl.
 *H04J 3/07* (2006.01)
(52) U.S. Cl. .......... 370/508; 370/503; 370/520
(58) Field of Classification Search .......... 370/341, 370/342, 343, 508, 503, 520
See application file for complete search history.

(56) References Cited

U.S. PATENT DOCUMENTS

| | | |
|---|---|---|
| 2002/0196731 A1 | 12/2002 | Laroia et al. |
| 2003/0026371 A1 | 2/2003 | Laroia et al. |
| 2004/0156386 A1 | 8/2004 | Atarashi et al. |
| 2005/0088996 A1 | 4/2005 | Kawamura et al. |
| 2007/0025326 A1 | 2/2007 | Kikuchi et al. |
| 2007/0133695 A1* | 6/2007 | Kotzin .................. 375/260 |

FOREIGN PATENT DOCUMENTS

| | | |
|---|---|---|
| EP | 1 924 005 A2 | 5/2008 |
| JP | 2003-283374 A | 10/2003 |
| JP | 2004-297756 A | 10/2004 |
| JP | 2005-130256 A | 5/2005 |
| JP | 2007-36994 A | 2/2007 |
| JP | 2008-124942 | 5/2008 |

OTHER PUBLICATIONS

European Search Report dated Nov. 2, 2010.
Kawamura et al., Technical Report of IEICE (Institute of Electronics, Information and Communication Engineers), Radio Communication System (RCS 2003-141), 2003, vol. 103, No. 363, pp. 13-18.
Japanese Office Action dated Oct. 18, 2011 (with a partial English translation).

* cited by examiner

*Primary Examiner* — Kibrom T Hailu
*Assistant Examiner* — Dady Chery
(74) *Attorney, Agent, or Firm* — McGinn IP Law Group, PLLC (57) ABSTRACT

A wireless communication system includes a base station and a terminal station. The base station extracts paths that have a power level that exceeds a predetermined threshold value from delay profiles of the terminal station as available paths, selects a path having a maximum power or a first path from the available paths as a reference path, calculates a time difference between an arrival time of the reference path and a predetermined maximum arrival time, and transmits a result to the terminal station as a transmission timing control signal. The terminal station adjusts the transmission timing to the base station according to the time difference. The base station transmits the transmission timing control signal only when the base station detects the reference path.

17 Claims, 7 Drawing Sheets

WIRELESS COMMUNICATION SYSTEM, BASE STATION, AND WIRELESS COMMUNICATION METHOD

RELATED APPLICATION

This application is claiming the priority of Japanese Patent Application No. 2007-172463 filed on Jun. 29, 2007, the entire disclosure thereof being herein incorporated with reference thereto.

TECHNICAL FIELD

The present invention relates to a wireless communication system, base station, and wireless communication method, and particularly to a wireless communication system, base station, and wireless communication method capable of adaptive transmission timing control.

BACKGROUND

In a DS-CDMA (Direct-Spread Code Division Multiple Access) transmission method, the frequency (spectral) efficiency is improved by synchronizing the receiving timings of reference paths among terminal stations at the base station thereby securing the orthogonality between the reference paths of the terminal stations that access to the base station simultaneously.

In the present document, "available (effective) path" means a path having a power level exceeding a predetermined threshold power level and "reference path" means a path having a highest power among the available paths or the first (coming) path, i.e., a path having the shortest arrival time.

As a method for maintaining the synchronization of the receiving timings of reference paths among the terminal stations at the base station, the adaptive transmission timing control method is known (Non-Patent Document 1).

A case where the adaptive transmission timing control method is applied in a conventional wireless communication system will be described below.

Figure 5A:
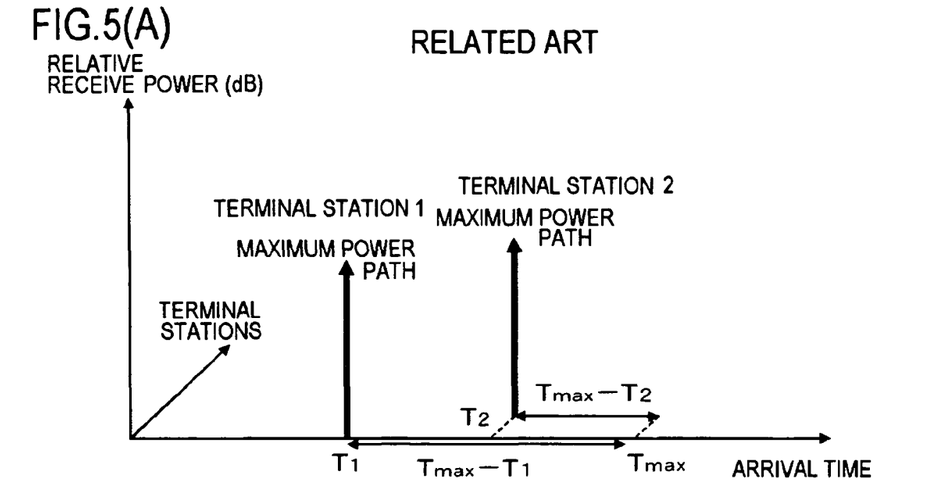
FIGS. 5(A) and (B) show delay profiles before and after adaptive transmission timing control is applied in a conventional wireless communication system.
Figure 5B:
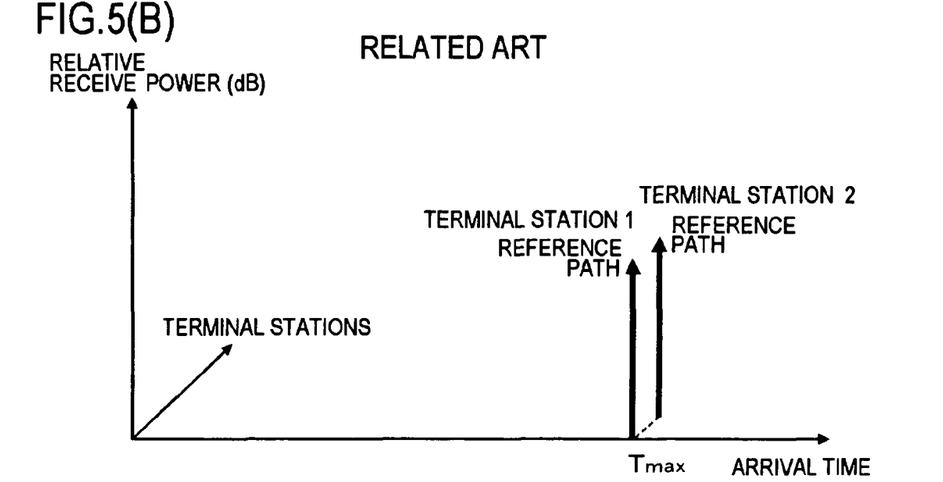

FIGS. 5(A) and (B) show delay profiles before and after the adaptive transmission timing control method is applied.

FIG. 5(A) shows the results when the delay profiles relating to two terminal stations 1 and 2 have been obtained at the base station.

The base station calculates an arrival time difference $T_{max}-T_1$, the difference between a maximum arrival time $T_{max}$ (a fixed value) assumed for an arrival path and an arrival time $T_1$ of the reference path of the terminal station 1, and notifies the result to a terminal station 1 as a timing offset value.

Similarly, the base station calculates an arrival time difference $T_{max}-T_2$, the difference between the maximum arrival time $T_{max}$ and an arrival time $T_2$ of a reference path of a terminal station 2, and notifies the result to the terminal station 2 as a timing offset value, followed by transmission.

The terminal stations 1 and 2 offset their transmission timings by adding these timing offset values to predetermined initial values, followed by transmission.

At this time, as shown in FIG. 5(B), the reference path timings of the terminal stations 1 and 2 are synchronized by the base station at the maximum arrival time $T_{max}$.

When no available path having a power level exceeding the threshold value is detected at the base station, a method in which a path having a maximum power is defined as a reference path can be used as an adaptive transmission timing control method.

However, in the case where the path timing is not accurate, if one tries to move this path to the position of $T_{max}$, the position of the right (true) path timing will greatly deviate from the searchable range and the path timing of the terminal station may not be found.

Figure 6A:
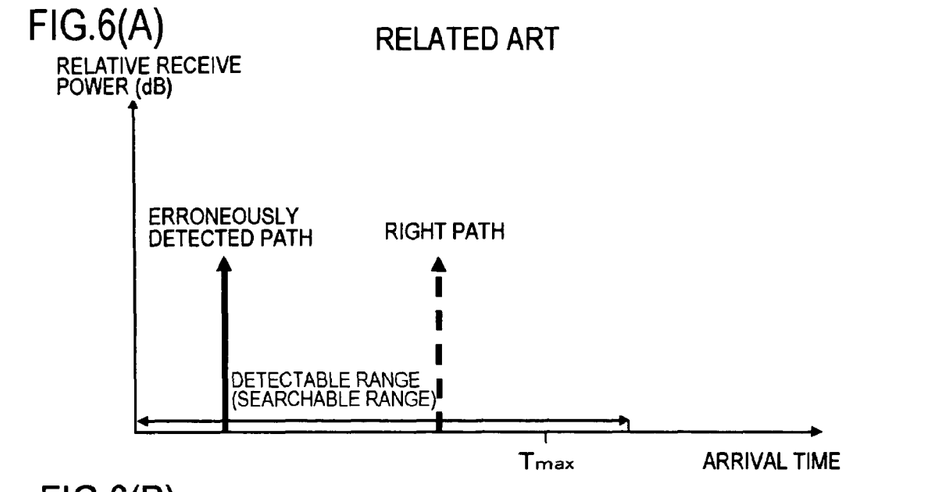
FIGS. 6(A) and (B) show delay profiles before and after adaptive transmission timing control is applied in a case where paths are erroneously detected in the conventional communication system.
Figure 6B:
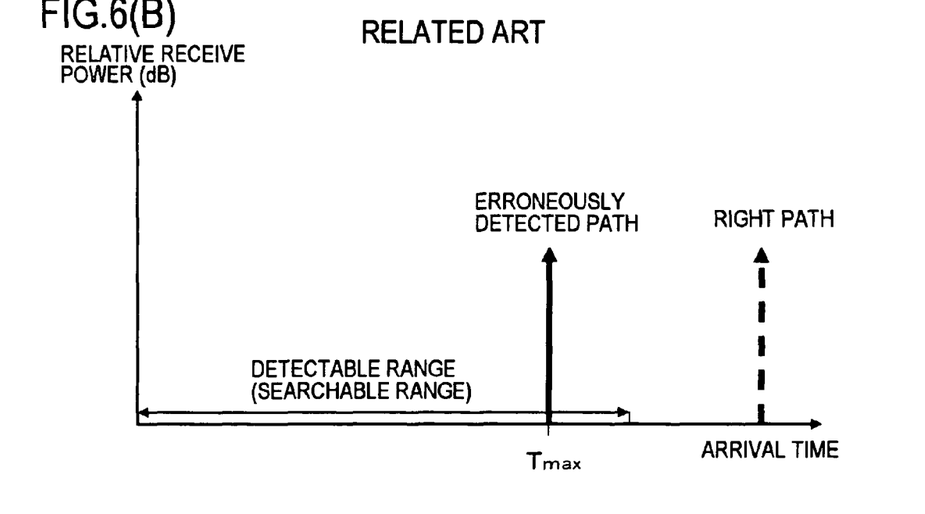

FIGS. 6(A) and (B) show delay profiles before and after the adaptive transmission timing control method is applied in a case where the paths are erroneously detected in the conventional communication system.

Here, we will assume that the transmission timing needs to be delayed so that the reference path arrives at the arrival time of $T_{max}$ shown in FIG. 6(A).

Since the arrival time $T_{max}$ is the maximum arrival time of signals assumed, arrival times later than this are not in the searchable range in designing of the wireless communication system.

FIG. 6(A) shows a case where a wrong path is selected as the reference path.

Referring to FIG. 6(B), if this erroneously selected path is moved to the position of $T_{max}$, the right path will be outside of the searchable range and the base station will not be able to find the path of the terminal station.

[Non-Patent Document 1]
Kawamura et al., Technical Report of IEICE (Institute of Electronics, Information and Communication Engineers), Radio Communication System (RCS 2003-141), 2003, vol. 103, no. 363, pp. 13-18

SUMMARY OF THE DISCLOSURE

The present inventor made the following analysis. In the case where no path having a power level exceeding the threshold value is detected, a method that instructs the terminal stations not to change the transmission timing can be used as an other method performing the adaptive transmission timing control (Patent Document 1, which is an earlier application of the same applicant.).

[Patent Document 1]
Japanese Patent Application No. JP-P2006-308524 (filed on Nov. 15, 2006, published as Kokai publication No. JP2008-124942A1)

The entire disclosures of the above mentioned documents (Non-Patent Doc. 1 and Patent Doc. 1) are incorporated herein by reference thereto.

However, in the method disclosed in Patent Document 1, if no path having a power level exceeding the threshold value is detected for a long period of time due to shadowing effects, a wasteful control signal(s) whose only purpose is to give the instruction to maintain the timing should continue to be transmitted. Such a control signal(s) will become an interference source not only for other channels in the same cell, but also for other cells.

Therefore, in a wireless communication system based on an adaptive transmission timing control method, the amount of interference caused by the transmission timing control signal to other channels and other cells in downlink transmission should be reduced, too.

Thus, it is an object of the present invention to provide a novel wireless communication system, method and base station therefor, which can securely and effectively find the path for the terminal stations. Further it is desirable to provide such a system, during multiple access operation.

According to a first aspect of the present invention, there is provided a wireless communication system which comprises a base station and a terminal station. The base station extracts a path(s) having power level(s) that exceeds a predetermined threshold value from delay profiles of the terminal station as available (effective) paths, selects a path having a maximum power or a first path from the available paths as a reference path. Then it calculates time difference between an arrival time of the reference path and a predetermined maximum arrival time, and transmits the result to the terminal station as a transmission timing control signal. The terminal station adjusts the transmission timing to the base station according to the time difference. The base station transmits the transmission timing control signal only when the base station detects the reference path.

According to a second aspect of the present invention, there is provided a wireless communication system which comprises a base station and a terminal station. The base station extracts a path(s) having power level(s) that exceeds a predetermined threshold value from delay profiles of the terminal station as available (effective) paths, selects a path having a maximum power or a first path from the available paths as a reference path. Then, it calculates time difference between an arrival time of the reference path and a predetermined maximum arrival time, and transmits the result to the terminal station as a transmission timing control signal. The terminal station adjusts the transmission timing to the base station according to the time difference. The base station transmits the transmission timing control signal only when the base station determines that the terminal station needs to change the transmission timing.

According to a third aspect of the present invention, there is provided a base station which extracts a path(s) having power level(s) that exceeds a predetermined threshold value from delay profiles of a terminal station as available (effective) paths, and selects a path having a maximum power or a first path from the available paths as a reference path. The base station calculates time difference between an arrival time of the reference path and a predetermined maximum arrival time, and transmits the result to the terminal station as a transmission timing control signal. The base station transmits the transmission timing control signal only when the base station detects the reference path.

According to a fourth aspect of the present invention, there is provided a base station which extracts a path(s) having power level(s) that exceeds a predetermined threshold value from delay profiles of a terminal station as available paths, and selects a path having a maximum power or a first path from the available paths as a reference path. It calculates time difference between an arrival time of the reference path and a predetermined maximum arrival time, and transmits the result to the terminal station as a transmission timing control signal. It transmits the transmission timing control signal only when the base station determines that the terminal station needs to change the transmission timing.

According to a fifth aspect of the present invention, there is provided a wireless communication method including: (a) extracting a path(s) having power level(s) that exceeds a predetermined threshold value from delay profiles of a terminal station as available (effective) paths at a base station, and (b) selecting a path having a maximum power or a first path from the available paths as a reference path at the base station. Only when the reference path is detected, it further includes (c) calculating time difference between an arrival time of the reference path and a predetermined maximum arrival time and transmitting the result to the terminal station from the base station as a transmission timing control signal, and (d) adjusting the transmission timing to the base station according to the time difference at the terminal station.

According to a sixth aspect of the present invention, there is provided a wireless communication method including: (a) extracting a path(s) having power level(s) that exceeds a predetermined threshold value from delay profiles of a terminal station as available paths at a base station, (b) selecting a path having the maximum power or a first path from the available paths as a reference path at the base station, and (c) having the base station determine whether or not the terminal station should change the transmission timing. Only when it is determined that the transmission timing needs to be changed in the determining process, it further includes (d) calculating the difference between the arrival time of the reference path and a predetermined maximum arrival time and transmitting the result to the terminal station from the base station as a transmission timing control signal, and (e) having the terminal station adjust the transmission timing to the base station according to the time difference at the terminal station.

According to a seventh aspect of the present invention, there is provided a wireless communication method which includes: (a) extracting a path(s) having power level(s) that exceeds a predetermined threshold value from delay profiles of a terminal station as available paths at a base station and (b) selecting a path having a maximum power or a first path from the available paths as a reference path at the base station. Only when the reference path is detected, it further includes: (c) calculating time difference between the arrival time of the reference path and a predetermined maximum arrival time and transmitting the result to the terminal station from the base station as a transmission timing control signal.

According to an eighth aspect of the present invention, there is provided a wireless communication method which includes: (a) extracting a path(s) having power level(s) that exceeds a predetermined threshold value from delay profiles of a terminal station as available paths at a base station, (b) selecting a path having a maximum power or a first path from the available paths as a reference path at the base station, and (c) having the base station determine whether or not the terminal station should change the transmission timing. Only when it is determined that the transmission timing needs to be changed in the determining process, it further includes: (d) calculating time difference between an arrival time of the reference path and a predetermined maximum arrival time, and transmitting the result to the terminal station from the base station as a transmission timing control signal.

In a wireless communication system of a first development, it is preferable that the base station determines that the terminal station does not need to change the transmission timing when the difference between the arrival time of the reference path and the maximum arrival time is not more than a predetermined value.

In a wireless communication system of a second development, it is preferable that, when time difference between an arrival time of a reference path for a first terminal station and an arrival time of a reference path for a second terminal station is not more than a predetermined threshold value, the base station determines that the transmission timings of the both terminal stations do not need to be changed.

In a wireless communication system of a third development, the predetermined threshold value may be a CP (Cyclic Prefix) length.

It is preferable that a base station of a fourth development determines that the terminal station does not need to change the transmission timing when the time difference between the arrival time of the reference path and the maximum arrival time is not more than a predetermined value.

It is preferable that, when the time difference between an arrival time of a reference path for a first terminal station and an arrival time of a reference path for a second terminal station is not more than a predetermined threshold value, the base station of a fifth development determine that the transmission timings of the both terminal stations do not need to be changed.

In a base station of a sixth development, the predetermined threshold value may be a CP (Cyclic Prefix) length.

In a wireless communication method of a seventh development, it is preferable to determine that the terminal station does not need to change the transmission timing in the determining process (c) when the difference between the arrival time of the reference path and the maximum time is not more than a predetermined threshold value.

In a wireless communication method of an eighth development, it is preferable to determine that, when time difference between an arrival time of a reference path for a first terminal station and an arrival time of a reference path for a second terminal station is not more than a predetermined threshold value, the transmission timings of the both terminal stations do not need to be changed in the determining process (c).

In a wireless communication method of a ninth development, the predetermined threshold value in the determining process (c) may be a CP (Cyclic Prefix) length.

In a wireless communication method of a tenth development, it is preferable to determine that the terminal station does not need to change the transmission timing in the determining process (c) when the time difference between the arrival time of the reference path and the maximum time is not more than a predetermined threshold value.

In a wireless communication method of an eleventh development, it is preferable to determine that, when time difference between an arrival time of a reference path for a first terminal station and an arrival time of a reference path for a second terminal station is not more than a predetermined threshold value, the transmission timings of the both terminal stations do not need to be changed in the determining process (c).

In a wireless communication method of a twelfth development, the predetermined threshold value in the determining process (c) may be a CP (Cyclic Prefix) length.

The meritorious effects of the present invention are summarized as follows, however, without limitation thereto.

In a wireless communication system relating to the present invention, when no path exceeding a threshold value is detected by a base station and the base station determines that the timing of the transmission signal of a terminal station does not need to be changed, the base station does not transmit a transmission timing control signal to the terminal station.

As a result, the interference by the transmission timing control signal with other channels in the same cell and with other cells in down link transmission can be prevented.

Figure 7:
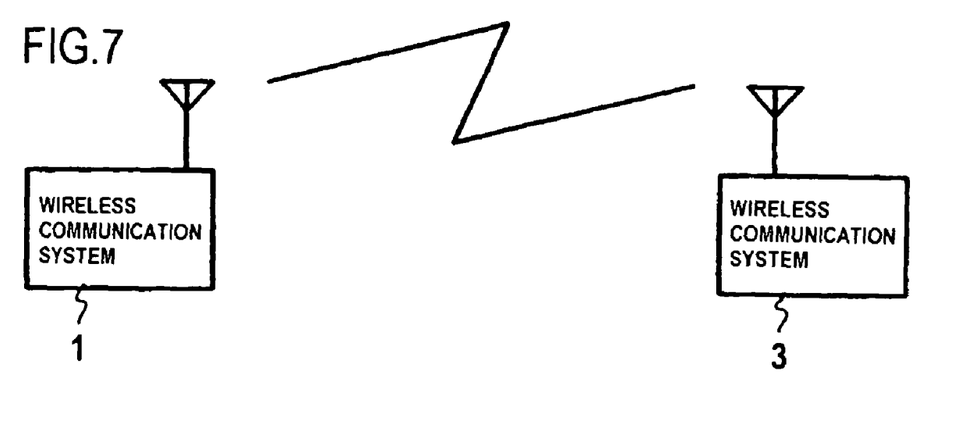
FIG. 7 is a block diagram showing an example of a basic formulation of a wireless communication system relating to the present invention.

EXPLANATIONS OF SYMBOLS 1, 3: wireless communication apparatus (first, second)
10: base station
11, 31: antenna
12, 32: DUP (duplexer for transmission and reception)
13, 33: receiver
14: data demodulator
15: delay profile calculator
16: path detector
17: transmission timing control signal generating unit
18: transmission timing control signal synthesis determining unit
19, 37: signal synthesizer
20, 39: transmitter
30, 30a, 30b: terminal station
34: signal separator
35: channel estimator
36: transmission timing control signal demodulator
38: transmission timing control unit
Preferred Modes FIG. 7 shows an example of a basic formulation of a wireless communication system including first and second wireless communication apparatus which may be for example, a base station and a terminal station, respectively.

In an adaptive transmission timing system relating to the present invention, a base station 10 does not transmit a transmission timing control signal to a terminal station 30 when the base station 10 does not detect a reference path of the terminal station 30. Since the terminal station 30 cannot detect the transmission timing control signal, the terminal station 30 decides to maintain the current transmission timing.

Further, when the base station 10 determines that the adaptive transmission timing control has been settled and that it is not necessary to change the timing of the transmission signal of the terminal station 30, the base station 10 does not transmit the transmission timing control signal to the terminal station 30. Since the terminal station 30 cannot detect the transmission timing control signal, the terminal station 30 decides to maintain the current transmission timing.

In any of these cases described above, the interference by the transmission timing control signal with other channels in the same cell and with other cells in downlink transmission can be prevented by not transmitting the transmission timing control signal from the base station 10 to the terminal station 30.

EXAMPLES

Next, the present invention will be described with reference to the drawings.

Figure 1:
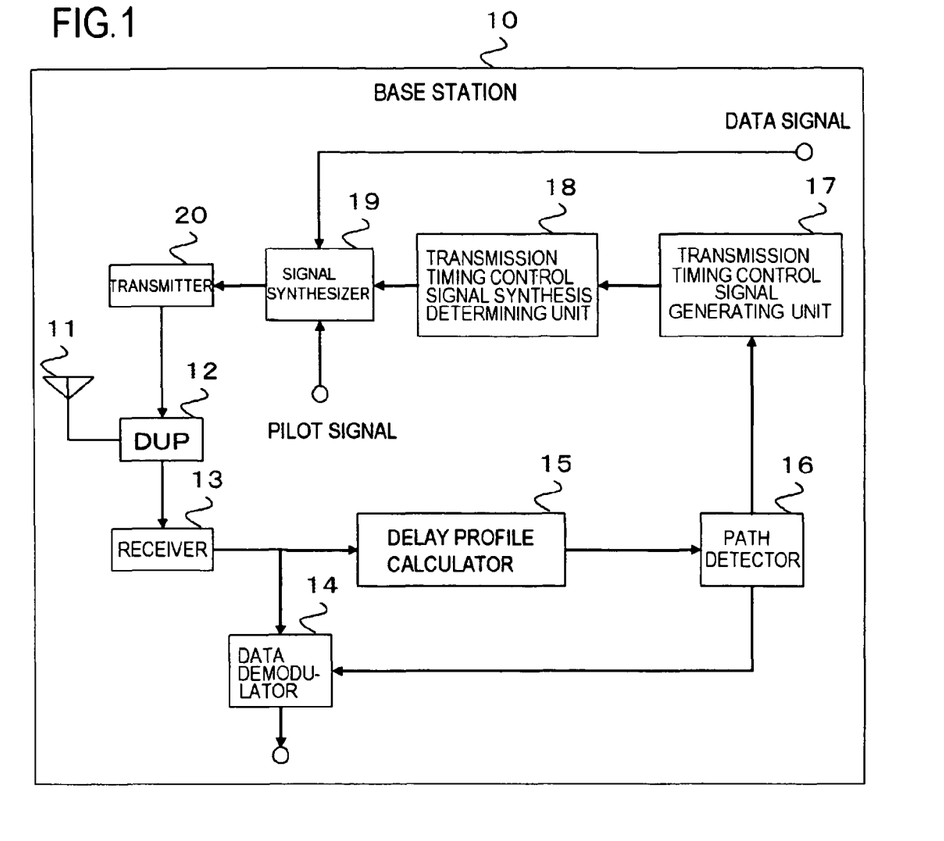
FIG. 1 is a drawing showing the configuration of a base station in a wireless communication system relating to an example of the present invention.

FIG. 1 is a drawing showing the configuration of a base station 10 in a wireless communication system relating to an example of the present invention.

The base station 10 comprises an antenna 11, a DUP (duplexer for transmission and reception) 12, a receiver 13, a data demodulator 14, a delay profile calculator 15, a path detector 16, a transmission timing control signal generating unit 17, a transmission timing control signal synthesis determining unit 18, a signal synthesizer 19, and a transmitter 20.

The receiver 13 receives a signal from a terminal station 30 via the antenna 11 and the DUP 12, and transmits the signal to the data demodulator 14 and the delay profile calculator 15.

The delay profile calculator 15 calculates delay profiles using a pilot signal.

The path detector 16 detects an arriving path(s) exceeding a threshold value from the delay profiles.

The data demodulator 14 demodulates received data based on the timing(s) of the arriving path(s).

The path detector 16 further selects a path having a maximum power as a reference path from the arriving paths.

The transmission timing control signal generating unit 17 calculates time difference between an arrival time of the reference path and a maximum arrival time $T_{max}$ among the arrival times of the paths arriving at the base station 10, generates a transmission timing control signal including this information, and transmits the signal to the transmission timing control signal synthesis determining unit 18.

Here, when no path exceeding the threshold value is detected, this information is also transmitted to the transmission timing control signal synthesis determining unit 18.

The transmission timing control signal synthesis determining unit 18 determines whether or not the transmission timing control signal should be synthesized with other signals, and when the transmission timing control signal synthesis determining unit 18 determines that the synthesis is necessary, it transmits the transmission timing control signal to the signal synthesizer 19.

When no path exceeding the threshold value is detected, the transmission timing control signal synthesis determining unit 18 determines that the transmission timing control signal should not be synthesized. In this case, the transmission timing control signal is not transmitted to the terminal station 30 from the base station 10.

The signal synthesizer 19 code-multiplexes the transmission timing control signal, the pilot signal, and a data signal using different orthogonal codes.

The signal synthesizer 19 transmits the synthesized signal to the terminal station 30 via the transmitter 20, the DUP 12, and the antenna 11.

Figure 2:
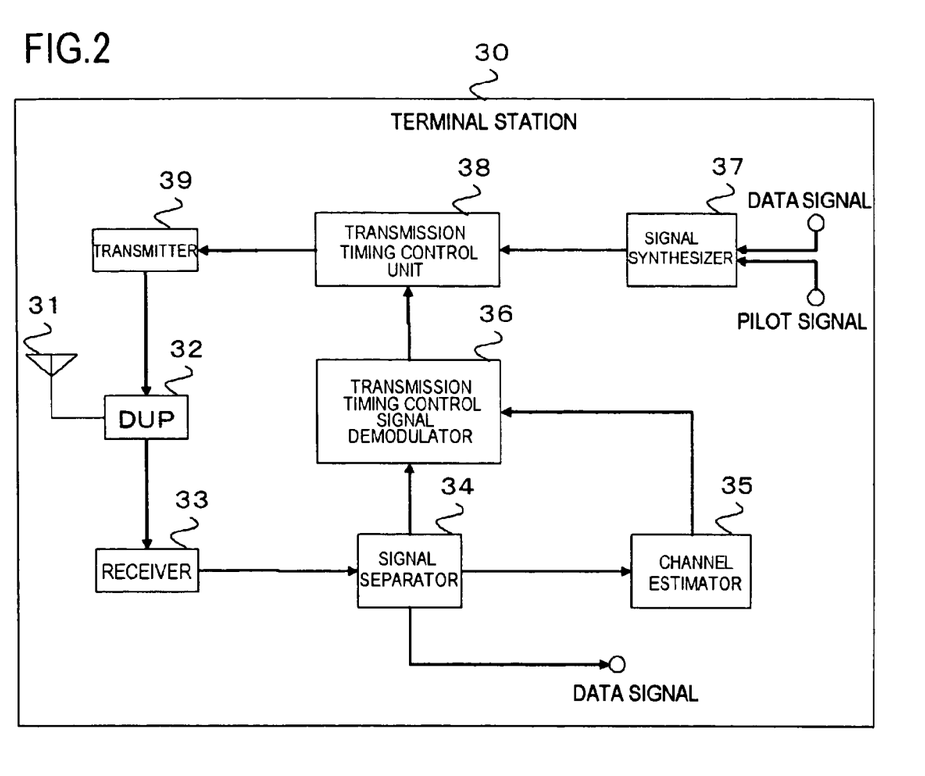
FIG. 2 is a drawing showing the configuration of a terminal station in the wireless communication system relating to an example of the present invention.

FIG. 2 is a drawing showing the configuration of a terminal station 30 in the wireless communication system relating to an example of the present invention.

Referring to FIG. 2, the terminal station 30 comprises an antenna 31, a DUP 32, a receiver 33, a signal separator 34, a channel estimator 35, a transmission timing control signal demodulator 36, a signal synthesizer 37, a transmission timing control unit 38, and transmitter 39.

The receiver 33 receives the signal from the base station 10 via the antenna 31 and the DUP 32, and transmits it to the signal separator 34.

The signal separator 34 separates the data signal, the pilot signal, and the transmission timing control signal, and transmits the pilot signal to the channel estimator 35 and the transmission timing control signal to the transmission timing control signal demodulator 36.

The channel estimator 35 calculates a channel estimation value based on the pilot signal and transmits the result to the control signal demodulator 36.

The transmission timing control signal demodulator 36 demodulates the transmission timing control signal using the channel estimation value and transmits the transmission timing offset amount information in the demodulated data to the transmission timing control unit 38.

Here, when the demodulation of the transmission timing control signal fails, the previous transmission timing is transmitted to the transmission timing control unit 38.

The signal synthesizer 37 synthesizes the data signal and the pilot signal, and transmits the result to the transmission timing control unit 38.

The transmission timing control unit 38 delays the transmitted signal according to the transmission timing offset amount and then transmits the delayed signal to the base station 10 via the transmitter 39, the DUP 32, and the antenna 31.

The operation of the transmission timing control signal synthesis determining unit 18 in the base station 10 is described in detail below.

Figure 3:
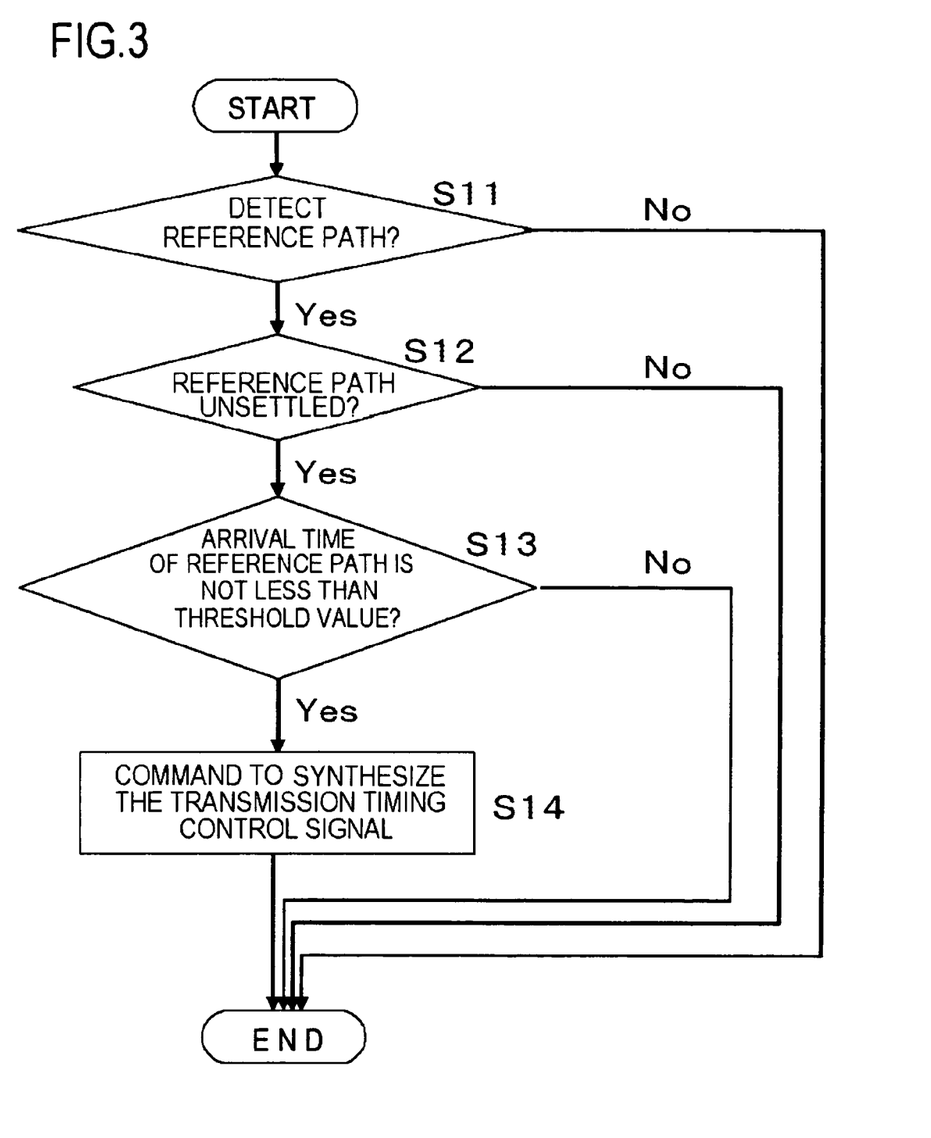
FIG. 3 is a flowchart showing the operation of a transmission timing control signal synthesis determining unit built into the base station in the wireless communication system relating to an example of the present invention.

FIG. 3 is a flowchart showing an operation of the transmission timing control signal synthesis determining unit 18 built into the base station 10 in the wireless communication system relating to the example of the present invention.

When the transmission timing control signal synthesis determining unit 18 determines that no path exceeding the threshold value is detected and no reference path is detected ("No" in step S11), it does not synthesize the transmission timing control signal.

In this case, the base station 10 does not transmit the transmission timing control signal to the terminal station 30, and consequently the terminal station 30 maintains the current transmission timing since it cannot detect the transmission timing control signal.

By not transmitting the transmission timing control signal from the base station 10 to the terminal station 30, any interference caused by the transmission timing control signal with other channels in the same cell and with other cells in downlink transmission can be reduced.

Further, in a system in which the cyclic prefix (CP) is inserted in the transmitted signal, if the propagation delay differences between the reference paths of the terminal stations are within the CP length, the orthogonality between the terminal stations in multiple access using FDMA in uplink transmission can be secured.

Therefore, when the time difference between the arrival time of the reference path and $T_{max}$ is not more than the CP length and the transmission timing control signal synthesis determining unit 18 determines that the reference path has settled ("No" in step S12), the following provision may be also employed that the transmission timing control signal is not synthesized since it is not necessary to change the transmission timing of the signal transmitted from the terminal station 30.

Figure 4:
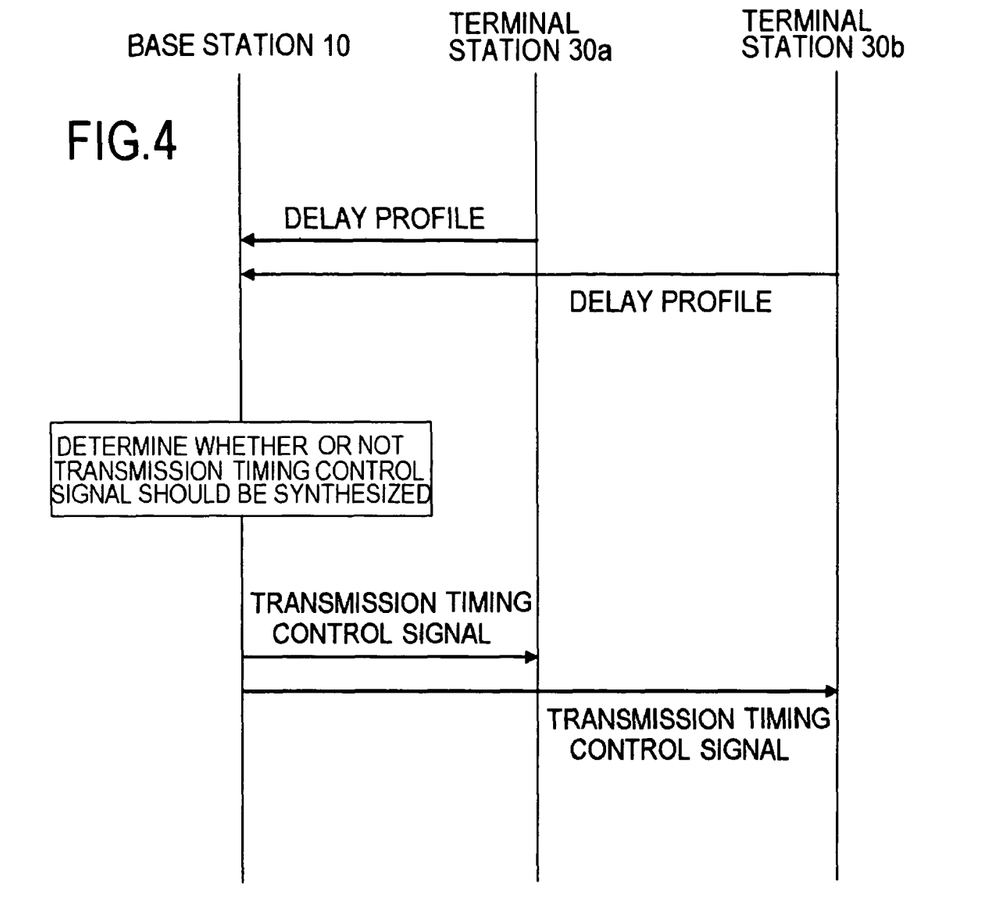
FIG. 4 is a sequence diagram of adaptive transmission timing control in the wireless communication system relating to an example of the present invention.

FIG. 4 is a sequence diagram of the adaptive transmission timing control in the wireless communication system relating to an example of the present invention.

When the transmission timing control signal synthesis determining unit 18 determines that the time difference in arrival times between the respective reference paths of terminal stations 30a and 30b is not more than the CP length ("No" in step S13), the transmission timing control signal synthesis determining unit 18 may be also formulated such that it may not synthesize the transmission timing control signal since it is not necessary to change the transmission timing of the signal transmitted between the terminal stations 30a and 30b.

The interference by the transmission timing control signal with other channels in the same cell and with other cells in downlink transmission can be reduced in this case as well.

The transmission timing control signal synthesis determining unit 18 determines that it should (send a command to) synthesize the transmission timing control signal (step S14) only when it is determined that the reference path is detected, this reference path has not settled, and that the difference in arrival time between each reference path of the terminal stations 30*a* and 30*b* is not less than a threshold value (all "Yes" in the steps S11 to 13).

For the details, the entire disclosure of Japanese Patent Application No. JP-P2006-308524 is herein incorporated by reference thereto.

It should be noted that other objects, features and aspects or modes of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A wireless communication system, comprising:
   a base station; and
   a terminal station,
   wherein said base station extracts paths that have a power level that exceeds a predetermined threshold value from delay profiles of said terminal station as available paths, selects a path having a maximum power or a first path from said available paths as a reference path, calculates, as a transmission timing control signal, a time difference between an arrival time of said reference path and a predetermined maximum arrival time, and when said base station does not detect said reference path, said base station sets, as said transmission timing control signal, a signal that instructs said terminal station to maintain a transmission timing,
   wherein said terminal station adjusts the transmission timing to said base station according to said time difference, and
   wherein said base station transmits said transmission timing control signal to said terminal station when said base station detects said reference path and does not transmit said transmission timing control signal to said terminal station when said base station does not detect said reference path.

2. A wireless communication system, comprising:
   a base station; and
   a terminal station,
   wherein said base station extracts paths that have a power level that exceeds a predetermined threshold value from delay profiles of said terminal station as available paths, selects a path having a maximum power or a first path from said available paths as a reference path, calculates, as a transmission timing control signal, a time difference between an arrival time of said reference path and a predetermined maximum arrival time, and when said base station does not detect said reference path, said base station sets, as said transmission timing control signal, a signal that instructs said terminal station to maintain a transmission timing,
   wherein said terminal station adjusts the transmission timing to said base station according to said time difference, and
   wherein said base station transmits said transmission timing control signal to said terminal station when said base station determines that said terminal station needs to change the transmission timing and does not transmit said transmission timing control signal to said terminal station when said base station does not detect said reference path.

3. The wireless communication system as defined in claim 2, wherein said base station determines that said terminal station does not need to change the transmission timing when the time difference between the arrival time of said reference path and said maximum time is not more than the predetermined threshold value.

4. The wireless communication system as defined in claim 2, wherein, when a time difference between an arrival time of a reference path for a first terminal station and an arrival time of a reference path for a second terminal station is not more than a predetermined threshold value, said base station determines that said both terminal stations do not need to change the transmission timings.

5. The wireless communication system as defined in claims 3, wherein said predetermined threshold value comprises a Cyclic Prefix CP length.

6. The wireless communication system as defined in claim 2, wherein said base station determines that said terminal station needs to change the transmission timing only when said base station detects said reference path.

7. A base station, said base station:
   extracts paths having a power level that exceeds a predetermined threshold value from delay profiles of a terminal station as available paths;
   selects a path having a maximum power or a first path from said available paths as a reference path;
   calculates, as a transmission timing control signal, a time difference between an arrival time of said reference path and a predetermined maximum arrival time; and
   when said base station does not detect said reference path, said base station sets, as said transmission timing control signal, a signal that instructs said terminal station to maintain a transmission timing,
   wherein said base station transmits said transmission timing control signal to said terminal station when said base station detects said reference path and does not transmit said transmission timing control signal to said terminal station when said base station does not detect said reference path.

8. A base station, said base station:
   extracts paths having a power level that exceeds a predetermined threshold value from delay profiles of a terminal station as available paths;
   selects a path having a maximum power or a first path from said available paths as a reference path;
   calculates, as a transmission timing control signal, a time difference between an arrival time of said reference path and a predetermined maximum arrival time; and
   when said base station does not detect said reference path, said base station sets, as said transmission timing control signal, a signal that instructs said terminal station to maintain a transmission timing,
   wherein said base station transmits said transmission timing control signal to said terminal station when said base station determines that said terminal station needs to change the transmission timing and does not transmit said transmission timing control signal to said terminal station when said base station does not detect said reference path.

9. The base station as defined in claim 8, wherein said base station determines that said terminal station does not need to change the transmission timing when the time difference between the arrival time of said reference path and said maximum time is not more than a predetermined threshold value.

10. The base station as defined in claim 9, wherein said predetermined threshold value comprises a Cyclic Prefix CP length.

11. The base station as defined in claim 8, wherein said base station determines that, when a time difference between an arrival time of a reference path for a first terminal station and an arrival time of a reference path for a second terminal station is not more than a predetermined threshold value, the transmission timings of said both terminal stations do not need to be changed.

12. The base station as defined in claim 8, wherein said base station determines that said terminal station needs to change the transmission timing only when said base station detects said reference path.

13. A wireless communication method, the method comprising:
- extracting paths having a power level that exceeds a predetermined threshold value from delay profiles of a terminal station as available paths at a base station;
- selecting a path having a maximum power or a first path from said available paths as a reference path at said base station;
- calculating, as a transmission timing control signal, a time difference between an arrival time of said reference path and a predetermined maximum arrival time, and when said base station does not detect said reference path, said base station setting, as said transmission timing control signal, a signal that instructs said terminal station to maintain a transmission timing; and
- adjusting the transmission timing to said base station according to said time difference at said terminal station,
- wherein said base station transmits said transmission timing control signal to said terminal station when said base station detects said reference path and does not transmit said transmission timing control signal to said terminal station when said base station does not detect said reference path.

14. The wireless communication method as defined in claim 13, wherein the method further comprises:
- having said base station determine whether or not it is necessary to change transmission timing of said terminal station; and
- only when it is determined that the transmission timing needs to be changed in said determining process, said calculating said time difference and said adjusting the transmission timing are performed.

15. The wireless communication method as defined in claim 14, wherein it is determined that said terminal station does not need to change the transmission timing in said determining whether or not it is necessary to change the transmission timing of said terminal station, when said time difference between the arrival time of said reference path and said maximum time is not more than the predetermined threshold value.

16. The wireless communication method as defined in claim 15, wherein the predetermined threshold value in said determining whether or not it is necessary to change the transmission timing of said terminal station comprises a Cyclic Prefix CP length.

17. The wireless communication method as defined in claim 14, wherein, when a time difference between an arrival time of a reference path for a first terminal station and an arrival time of a reference path for a second terminal station is not more than a predetermined threshold value, it is determined that the transmission timings of said both terminal stations do not need to be changed in said determining whether or not it is necessary to change the transmission timing of said terminal station.

\* \* \* \* \*